(12) United States Patent
Hoffmann et al.

(10) Patent No.: US 7,621,170 B2
(45) Date of Patent: Nov. 24, 2009

(54) METHOD AND SYSTEM FOR FUNCTION TESTING A VALVE

(75) Inventors: Heinfried Hoffmann, Frankfurt am Main (DE); Thomas Karte, Bruchköbel (DE); Joerg Kiesbauer, Eppertshausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/870,091

(22) Filed: Oct. 10, 2007

(65) Prior Publication Data

US 2008/0092632 A1   Apr. 24, 2008

(30) Foreign Application Priority Data

Oct. 20, 2006  (DE)  ............. 10 2006 049 649

(51) Int. Cl.
  *G01L 27/00* (2006.01)
(52) U.S. Cl. ............................................. 73/1.72
(58) Field of Classification Search ............ 73/1.72, 73/1.57, 37, 700
  See application file for complete search history.

(56) References Cited

U.S. PATENT DOCUMENTS

| | | | | |
|---|---|---|---|---|
| 3,431,835 A | * | 3/1969 | Angold | 99/408 |
| 4,825,198 A | * | 4/1989 | Rolker et al. | 340/605 |
| 5,355,677 A | * | 10/1994 | Hawkins et al. | 60/609 |
| 6,131,599 A | * | 10/2000 | DeGood et al. | 137/70 |
| 6,862,914 B1 | * | 3/2005 | Zachary et al. | 73/1.72 |
| 7,313,497 B2 | * | 12/2007 | Breen et al. | 702/114 |

FOREIGN PATENT DOCUMENTS

EP   0 284 785   1/1991

* cited by examiner

*Primary Examiner*—Hezron Williams
*Assistant Examiner*—Gunnar J Gissel
(74) *Attorney, Agent, or Firm*—Schiff Hardin LLP

(57) ABSTRACT

In a method or system for function testing of a safety valve in engineering plant, it is tested whether the safety valve travels from a normal position to a predetermined final position in a certain operating situation of the plant. A bypass the valve bypasses the safety valve and assumes an idle position in a normal operation of the plant and a predetermined test position for function testing of the safety valve. The test position of the bypass valve is established such that a predetermined fluid flow through the bypass valve is permitted.

9 Claims, 2 Drawing Sheets

METHOD AND SYSTEM FOR FUNCTION TESTING A VALVE

BACKGROUND

The preferred embodiment relates to a method and system for function testing a valve particularly a safety valve, such as a globe valve, a butterfly valve, a ball cook valve or the like, in a process engineering plant, such as a petrochemical plant.

In one such method and with one such system a test is made to check whether the safety valve is capable of assuming from its so-called normal position as an either fully closed or fully open position in a certain operating situation, such as in an emergency situation to run the plant, to a predetermined final position such as, for example, a fully closed or fully open final position. The problem generally involved in such function testing is that closing the safety valve greatly detriments normal operation of the plant, it not seldom being necessary that the complete plant needs to be shut down to function test the safety valve.

It is known in implementing function testing of the safety valve to provide a bypass valve in parallel arranged in a line bypassing the safety valve. In normal operation of the plant the bypass valve is positioned idle, which is normally closed.

In function testing, the bypass valve is positioned to a test position. The sequence in stepping the method through function testing is specified, for example in ISA-TR96.05.01/2000 as follows: the bypass valve is first to be fully opened; then the safety valve is to be closed, for example by deactivating a solenoid valve which controls a pneumatic actuator positioning the safety valve; by means of a position sensor a test is then made as to whether the safety valve really has assumed the desired closed position; after this, the safety valve is to be reopened and it is sensed by the position sensor whether the safety valve returns to its fully open position; the bypass valve is then to be closed; and the closed position is then to be sensed by a corresponding position sensor assigned to the bypass valve.

With the safety valve open and the bypass valve closed normal operation of the plant is re-attained.

One drawback of this known function testing method is that parameters important for demonstrating proper functioning such as leakage and closing rate of the safety valve cannot be sensed without direct mechanical access to the valve.

Known from EP 0 284 785 A1 is a method of a leak-detection (tightness testing) device for two valves arranged in line in a fluid conduit.

It is an object to define a method and an assembly for function testing a safety valve with which an indication as to leakage or closing rate of the safety valve can now be obtained without detrimenting operation of the plant.

In a method or system for function testing of a safety valve in a process engineering plant, it is tested whether the safety valve travels from a normal position to a predetermined final position in a certain operating situation of the plant. A bypass valve bypasses the safety valve and assumes an idle position in a normal operation of the plant and a predetermined test position for function testing of the safety valve. The test position of the bypass valve is established such that a predetermined fluid flow through the bypass valve is permitted.

DESCRIPTION OF THE PREFERRED EMBODIMENT

Figure 1:
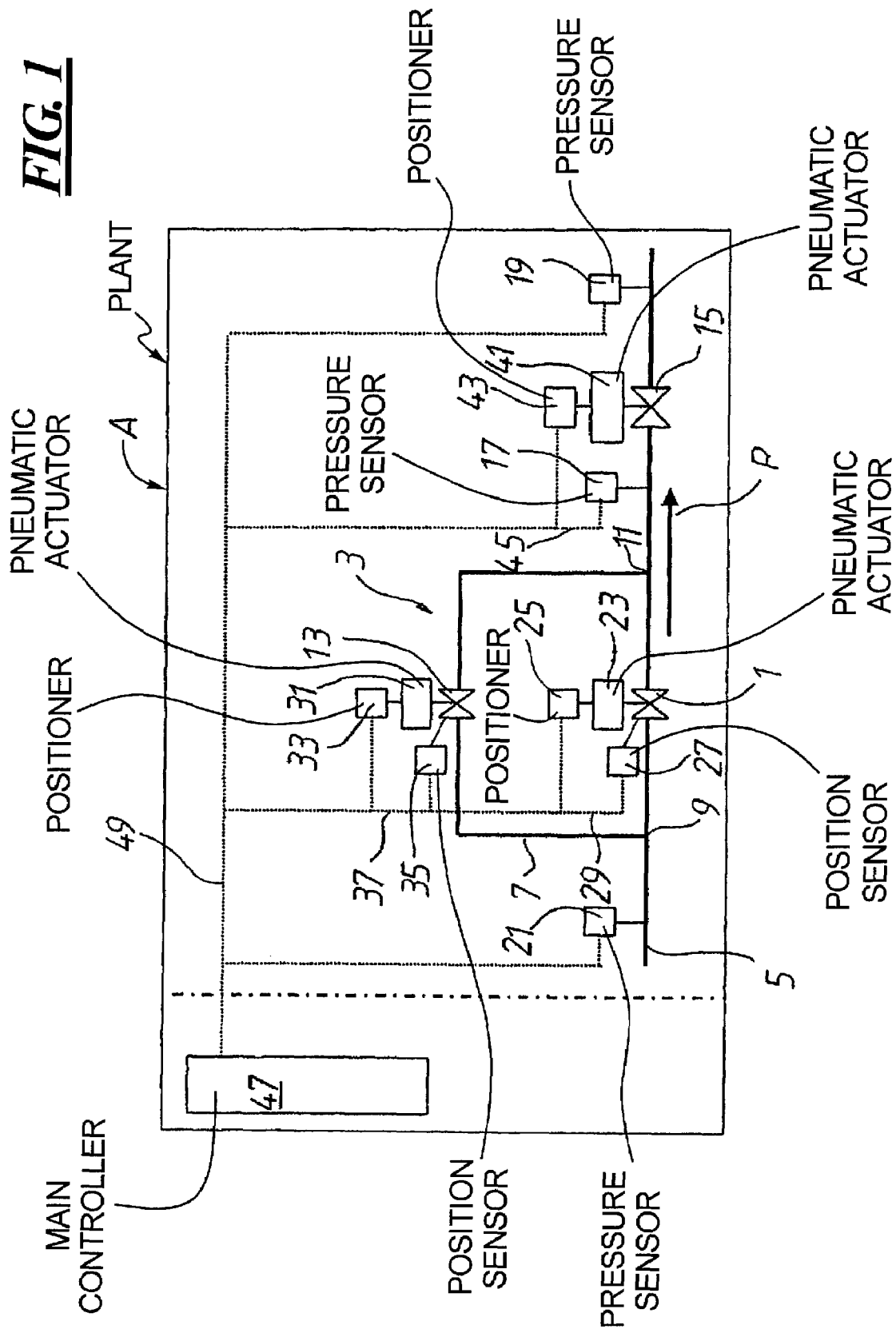
FIG. 1 is a block diagram of part of a plant including a main conduit and a bypass conduit.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

In accordance with the preferred embodiment, the bypass valve is activated such that it is positioned from its idle position into the test position so that a predetermined fluid flow is allowed to pass through the bypass valve. During positioning and/or while the bypass valve remains in a test position permitting a predetermined fluid flow through the bypass valve it is detected in accordance with the preferred embodiment whether and/or how the safety valve has attained the final position. The bypass valve as set defined creates a flow and pressure situation at the safety valve which is explicit, without detrimenting plant operation and which can be sensed by a corresponding sensor assembly preferably continuously. The results obtained can be compared to values as specified when the safety valve is functioning correctly. When the pressure and/or flow results fail to agree with the specified values or if violating a predetermined tolerance range, malfunctioning of the safety valve is to be assumed. When this discrepancy relates to the final position, as a rule a fully closed position, then it is to be assumed that the safety valve has a leaking closure. When the discrepancy relates to the travel distance of the safety valve in the final position, wear of the mechanical actuating assembly of the safety valve can be assumed.

In accordance with the preferred embodiment the bypass valve features a positioner with which the desired predetermined fluid flow through the bypass valve and the specified pressure difference at the safety valve can be set directly. The fluid flow can be set by the positioning of the bypass valve in accordance with the preferred embodiment so that the predetermined pressure difference exists at the safety valve in its final position when the safety valve really has assumed this final position. In an anticipated fully closed final position of the safety valve the pressure difference set as suitable for its lack of leakage can be tested, in addition to this, by way of the pressure difference and the rate and/or distance of travel of the safety valve when positioning the safety valve to its final position can be detected under conditions similar to those of normal operation. The predetermined fluid flow through the bypass valve is preferably reduced as compared to full flow through the safety valve in normal operation of the plant.

In one preferred aspect of the method the step in positioning the safety valve into its final position is not initiated until the bypass valve has assumed the test position. For example, when testing a fully closed final position of the safety valve the bypass valve is positioned to an opened condition as the test position. This aspect in accordance with the preferred embodiment of fully closing the safety valve for testing not before the bypass valve is open now ensures operation of the plant during testing without detriment thereto.

In another preferred aspect to ensure operation of plant without detriment, the fluid flow is maintained substantially constant during testing by the bypass valve and/or by the safety valve as compared to normal operation of the plant. To achieve this, a control valve can be inserted downstream of the safety valve and bypass valve assembly.

To minimize the duration of testing in ensuring a constant fluid flow in the plant, when positioning the bypass valve into the test position or shortly after having initiated positioning, the safety valve can be opposingly closed or opened simultaneously with the positioning of the bypass valve into the test position.

Preferably the bypass valve is partly opened and the safety valve fully closed to implement testing leakage of the safety valve in the fully closed final position and in testing the rate and distance of travel into the closed final position.

Should a collapse in pressure occur in the fluid flow in the plant caused by function testing, this can be compensated preferably with the aid of a control valve inserted upstream or downstream of the safety valve and bypass valve assembly.

On completion of function testing the safety valve is positioned at least partly open while the bypass valve is fully closed to ensure correct normal operation of the plant. Proper functioning, particularly as regards leakage, and distance and rate of travel of the bypass valve can be tested thereby with the aid of the pressure difference materializing in the fluid.

In another preferred aspect of the preferred embodiment an assembly for sensing the position of the safety valve and where necessary of the bypass valve is designed such that the position is sensed continually as to distance and rate of travel.

In still another aspect of the preferred embodiment testing is positioned by a common main positioner achieved either by communication with the corresponding positioner of the safety valve and bypass valve or is integrated in one of the two positioners.

In yet another preferred aspect of the preferred embodiment the bypass valve is assigned a position sensor which senses the position of the bypass valve particularly continually as to distance and rate of travel.

So that the safety valve can be positioned to assume a defined position and to configure it as a controllable actuator a positioner is provided for the safety valve. The positioner comprises a position sensor for determining the position of the safety valve, the position sensor being particularly capable of sensing the position of the safety valve continually as to distance and rate of travel. In another preferred aspect of the preferred embodiment the sensor assembly is provided to determine the pressure difference between an upstream and downstream side of the safety valve. The sensor assembly may involve a pair of pressure or flow sensors.

To test the safety valve for leakage in its fully closed final position, an acoustic sensor is preferably arranged at the safety valve. Normally, the safety valve can be integrated in a main conduit while the bypass valve is integrated in a bypass conduit connecting the main conduit. Upstream of the location where the bypass conduit branches off from the main conduit a pressure or flow sensor can be located to sense the flow values with which it can be tested whether the flow through the plant during function testing is detrimented. In a further embodiment, a control valve is integrated downstream of the safety valve and of the bypass valve particularly in the main conduit, a control valve being included particularly downstream of a pressure or flow sensor. The further control valve has the functioning of maintaining function testing operation of the plant undisrupted, the control valve being particularly required to maintain the flow through the plant constant during function testing.

Preferred in a host location, i.e. in a back end hardware level a main controller is configured to which the positioner of the safety valve, the positioner of the bypass valve and the control valve are connected. In an alternative aspect of the preferred embodiment the main controller may be accommodated in a casing of the safety valve, the bypass valve or of the control valve.

In another preferred aspect of the preferred embodiment the safety valve is operated by a pneumatic actuator, particularly a pneumatic tilt actuator activated by a solenoid valve which in a certain operating situation dumps the pneumatic actuator such that the safety valve is positioned into the final position particularly by a bias spring force contained in the actuator. In addition to pneumatic actuators, hydraulic or electrically operated actuators are feasible, and instead of a spring the energy of a pneumatic or hydraulic reservoir can be made use of to reliably ensure the final position of the actuator.

To optimize safety of the assembly as a whole both the safety valve and the bypass valve can feature a limit switch which signals when the valve concerned is in the fully open or fully closed position.

Referring now to FIG. 1 there is illustrated the assembly in accordance with the preferred embodiment for function testing a safety valve 1, the assembly being referenced by reference numeral 3. Integrated in a main conduit 5 of a process engineering plant A is a safety valve 1 bypassed by a bypass conduit 7. The arrow P denotes the direction of fluid flow through the main conduit 5. The bypass conduit 7 is connected to a splitter port 9 upstream of the safety valve 1 with the main conduit, it porting back into the main conduit 5 at a merging port 11 downstream of the safety valve in the main conduit 5. Integrated in the bypass conduit 7 is a merging port 11 parallel to the safety valve 1.

Integrated in the main conduit 5 downstream of the merging port 11 is a control valve 15. Arranged both upstream and downstream of the control valve 15 is a pressure sensor 17 and 19 respectively to sense the flow conditions of the fluid in the main conduit 5. A further pressure sensor 21 is provided upstream of the splitter port 9.

The safety valve 1 is operated with the aid of a pneumatic actuator 23 which in turn is controlled by a positioner 25. The safety valve 1 is accessed by a position sensor 27 which signals the position of the safety valve continually as to distance and rate of travel. The position sensor 27 is connected to the positioner 25 via a position signal conductor 29.

The bypass valve 13 is likewise positioned by a pneumatic actuator controlled by a positioner 33. Leakage of the bypass valve 13 is detected by a position sensor 35 which senses the position of the bypass valve 13 continually as to distance and rate of travel. For control of the bypass valve 13 the position sensor 35 is connected to the positioner 33 via a position signal conductor 37.

The position sensor 35 or 27 is provided particularly to "see" whether the bypass valve 13 or the safety valve 1 has assumed the fully closed position respectively.

In accordance with the position sensor 27, 35 an acoustic leakage sensor (not shown) such as an ultrasound sensor can be arranged in the region of the corresponding final control element of the safety valve 1 and bypass valve 13 which tests whether the bypass valve 13 or safety valve 1, particularly in normal operation of the plant, is fully closed or whether a leakage has occurred.

It is particularly in the case of an analog positioner (25, 33) of the pressure sensor 21 and bypass valve 13 respectively that, as an alternative to the position sensor 27, 25, an acoustic leakage sensor can be provided in each case to detect whether the bypass valve is in a fully closed or slightly open position, and whether the safety valve is fully closed or leaking.

The position sensor (27, 35) may be configured, for example, as an acoustic leakage sensor, such as an ultrasound sensor which tests whether the bypass valve, particularly in normal operation of the plant, is in a fully closed position or whether a leakage has occurred.

The control valve 15 has the function of maintaining the fluid flow P substantially constant within the plant A. In other words, when function testing the safety valve 1, positioning in function testing must be transparent to the overall functioning of plant operation. For this purpose the control valve 15 has a pneumatic actuator 41 which is positioned by the positioner 43. The positioner 43 receives via a pressure signal conductor 45 pressure signals from the pressure sensor 17 which access the main conduit 5 upstream of the control valve 15.

To provide a method of function testing without detrimenting operation of the plant A there is provided in a plant level remote from the valve level a main controller 47 which is connected via primary control conductors 49 to all positioners (25, 33, 43) of the safety valve 1, bypass valve 13 and control valve 15 respectively as well as to all position sensors (27, 35) and pressure sensors (21, 17, 19).

In one preferred aspect of the method in accordance with the prefer embodiment for function testing the safety valve 1, normal operation of the plant A is first assumed in which the safety valve 1 features an at least partly open position to permit passage of a desired fluid flow P through the main conduit 5. In this arrangement the safety valve 1 can be controlled via the positioner 25 to correspondingly change its flow bore for setting the fluid flow P within the main conduit 5. In normal operation of the plant A the bypass valve 13 is in a fully closed position so that fluid flow through the bypass conduit 7 is prevented.

In an emergency, the safety valve 1 must automatically close. For this purpose the pneumatic actuator 23 is dumped by de-energizing a solenoid valve (not shown) so that a biased spring (also not shown) of the safety valve 1 can release its potential energy to position the safety valve 1 into its fully closed final position.

The function testing method in accordance with the preferred embodiment involves detecting whether the safety valve 1 really has attained the fully closed final position and whether the safety valve 1 leaks in the fully closed final position.

To initiate the function testing method first the bypass valve 13 is opened so that also a fluid flow is involved which bypasses the safety valve 1 in the bypass conduit 7. The bypass valve 13 is activated by the positioner 33 such that it is bought into a predetermined, partial open position permitting a predetermined through flow through the bypass valve which is less than the full through flow through the safety valve 1 in normal operation of the plant A.

After this, an emergency situation is simulated by the solenoid valve (not shown) being de-energized so that the safety valve 1 travels to its fully closed final position. At the same time the bypass valve 13 remains in the partly open position so that a fluid flow can flow via the bypass conduit through the bypass valve 13. To permit compensating the reduced fluid flow P within the plant A via the bypass conduit through the bypass valve 13 the downstream control valve 15 can increase its flow bore as initiated by the positioner 43.

In the fully closed final position of the safety valve 1 the position sensor 27 which may be configured as an acoustic sensor then tests whether a fluid flow bypassing the safety valve 1 occurs. The pressure sensors 17, 21 upstream and downstream of the safety valve test for a pressure difference needed to materialize because of the partially open position of the bypass valve 13. If the safety valve 1 is not in the desired fully closed final position the pressure difference sensed will be smaller than expected at the pressure sensors 17, 21. The pressure sensors 17, 21 work continually as to distance and rate of travel so that the closing travel of the safety valve 1 can be tested by way of the resulting pressure difference.

All signals are applied via the primary control conductor 49 of the main controller 47 which tests whether the sensed values of the position sensors and of the pressure sensors agree with the anticipated desired values. If the discrepancy between the values as desired and as actual, malfunctioning of the safety valve 1 is indicated.

It is clear that the safety valve 1 can also be tested as to whether it is traveled into a full open position or in any other position as specified.

When it is detected that the safety valve 1 is working correctly, the functioning of the bypass valve 13 can also be tested, by first partly opening the safety valve 1 to again permit a fluid flow within the main conduit 5 between the splitter port 9 and merging port 11, after which the bypass valve 13 is fully closed. The position sensor 35 tests for leakage of the bypass valve 13 while the pressure sensors 17, 21 in turn test for a pressure difference as should materialize at the bypass valve because of the safety valve 1 being partly open. When the results of testing the pressure deviate from the desired values it is to be assumed that the bypass valve 13 is not in the correctly closed position.

Figure 2:
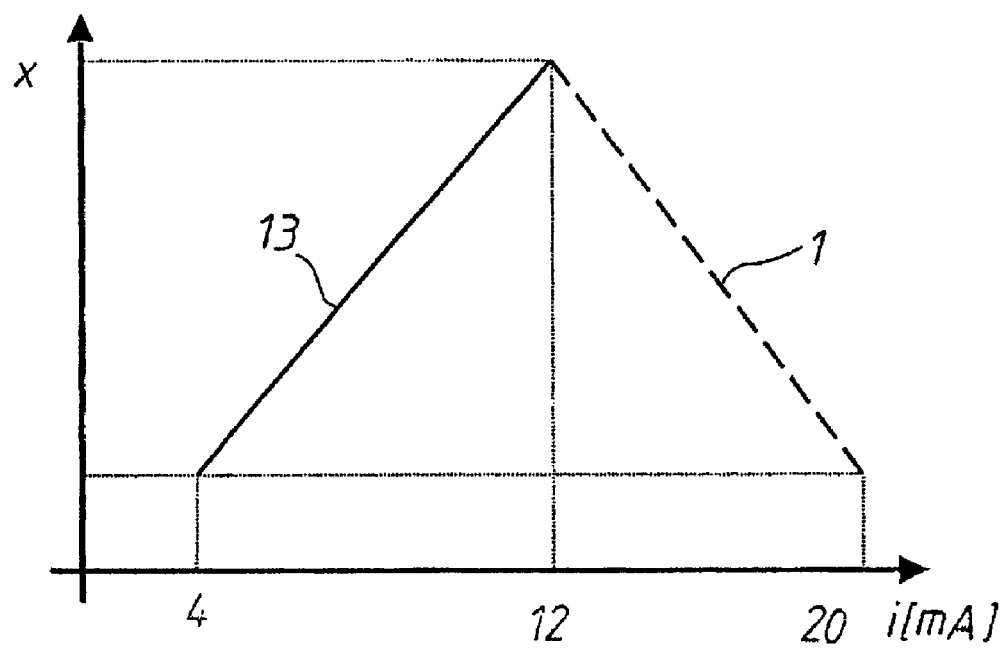
FIG. 2 and FIG. 3 each plot valve travel distances as a function of a control signal for positioning the valve concerned.
Figure 3:
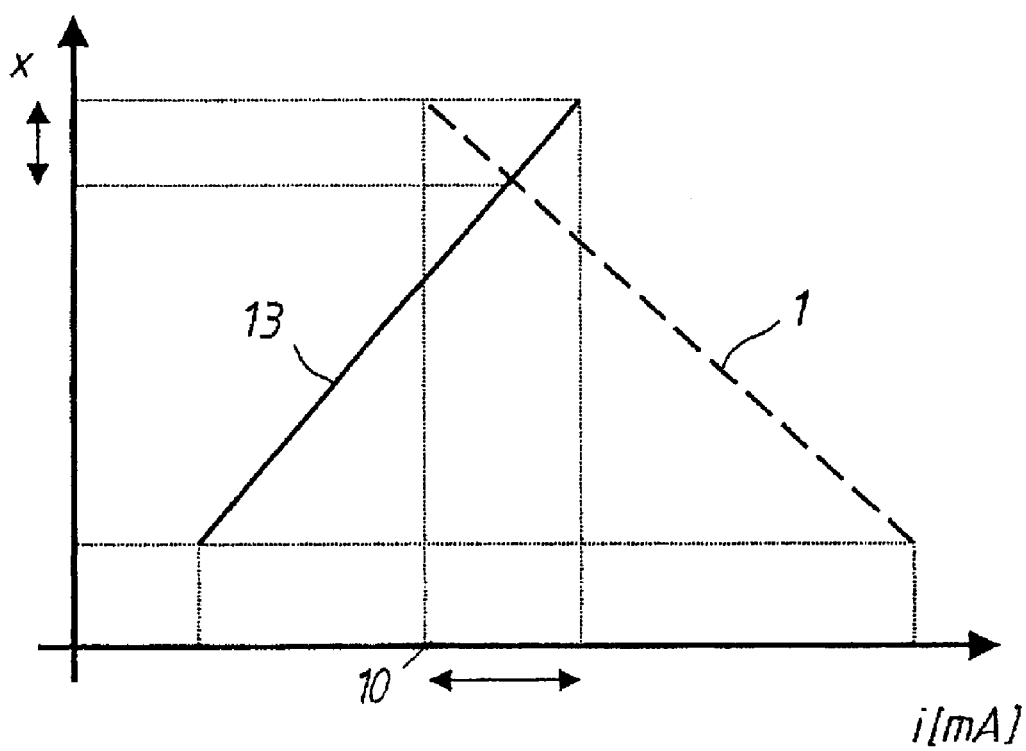

Referring now to FIGS. 2 and 3 there is plotted the valve travel x as a function of the position signal i of the positioner for both the safety valve 1 (broken line) and for the bypass valve 13 (solid line). The graph shown in FIG. 2 represents the so-called split range mode in which the safety valve 1 is not switched to the emergency situation until the bypass valve 13 has attained the desired test position. The method is initiated at a current level of the control signal i of 4 mA, the bypass valve 13 having attained the test position at a current level of 12 mA. Simultaneously with the 12 mA control signal the emergency situation for the safety valve 1 is simulated which travels to the desired final position up to a current level of 20 mA.

Referring now to FIG. 3 there is illustrated, as an alternative, how the test time can be shortened with the aid of the overlapping range as indicated by the double arrows. In the travel constellation as shown in FIG. 3, initiation of the emergency situation for a signalling current of 4 mA already materializes at 10 mA involving parallel travel of the bypass valve 13 and safety valve 1. The resulting reduction in the fluid flow P because of the travel range of the safety valve 1 and bypass valve 13 overlapping can be compensated with the aid of the downstream control valve 15.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control device. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for function testing of a safety valve for a process engineering plant, comprising the steps of:
    testing whether the safety valve travels from a normal position to a predetermined final position as a fully opened or closed end position in a certain operating situation of the plant, and wherein a bypass valve bypasses said safety valve and is capable of assuming an idle position as a closed position in a normal operation of the plant and a predetermined test position for function testing of said safety valve;
    establishing the test position of the bypass valve such that a predetermined fluid flow through the bypass valve is permitted and the fluid flow through the bypass valve is set such that with said safety valve in its final position at least one of an existing predetermined pressure difference is sensed for a leakage testing, a travel time is detected, or a distance of travel is detected for the safety valve; and
    compensating at least partially a drop in pressure in the fluid flow caused by the safety valve and the bypass valve as an assembly with aid of a control valve inserted downstream or upstream of the assembly.

2. A method for function testing of a safety valve for a process engineering plant, comprising the steps of:
    testing whether the safety valve travels from a normal position to a predetermined final position as a fully opened or closed end position in a certain operating situation of the plant, and wherein a bypass valve bypasses said safety valve and is capable of assuming an idle position as a closed position in a normal operation of the plant and a predetermined test position for function testing of said safety valve;
    establishing the test position of the bypass valve such that a predetermined fluid flow through the bypass valve is permitted and the fluid flow through the bypass valve is set such that with said safety valve in its final position at least one of an existing predetermined pressure difference is sensed for a leakage testing, a travel time is detected, or a distance of travel is detected for the safety valve; and
    in normal operation of the plant with a safety valve at least partially open the bypass valve is fully closed to also function test the bypass valve.

3. A method for function testing of a safety valve for a process engineering plant, comprising the steps of:
    testing whether the safety valve travels from a normal position to a predetermined final position as a fully opened or closed end position in a certain operating situation of the plant, and wherein a bypass valve bypasses said safety valve and is capable of assuming an idle position as a closed position in a normal operation of the plant and a predetermined test position for function testing of said safety valve;
    establishing the test position of the bypass valve such that a predetermined fluid flow through the bypass valve is permitted and the fluid flow through the bypass valve is set such that with said safety valve in its final position at least one of an existing predetermined pressure difference is sensed for a leakage testing, a travel time is detected, or a distance of travel is detected for the safety valve; and
    sensing the position of the safety valve and of the bypass valve continually as to distance and rate of travel.

4. A method for function testing of a safety valve through which a fluid flow occurs for normal operation in a process engineering plant but without shutting off the fluid flow to the process engineering plant during the testing, comprising the steps of:
    providing a bypass valve connected in parallel to the safety valve;
    with said fluid flow flowing for said normal operation opening the safety valve from a fully closed position to at least a partially open position permitting a predetermined flow through the bypass valve bypassing the safety valve and which is less than a full flow through the safety valve in said normal operation;
    simulating an emergency situation by now closing the safety valve to its fully closed position;
    sensing a pressure difference across the safety valve; and
    evaluating said pressure difference such that if said safety valve has an undesirable leakage in its fully closed position the pressure difference sensed will be smaller then an expected pressure difference for said partially open position of the bypass valve if the safety valve has an acceptable leakage or no leakage.

5. A method of claim 4 wherein a downstream control valve is provided for the process engineering plant and said safety valve which controls a desired fluid flow for said process plant during said normal operation and wherein to permit compensating a reduced fluid flow to the process engineering plant via the bypass valve during said testing, the downstream control valve is opened further to increase its flow to compensate for a difference between the safety valve flow during said normal operation and said fluid flow through said bypass valve.

6. A method of claim 4 wherein during said testing by opening said bypass valve, the pressure difference sensing is provided continually to test at least one of distance of movement of the safety valve and rate of travel of the safety valve so that at least one of the distance of movement and rate of travel of the safety valve can be tested by way of the pressure difference.

7. A method of claim 4 wherein the safety valve comprises one of a globe valve, a butterfly valve, or a ball valve.

8. A method for function testing of a safety valve through which a fluid flow occurs for normal operation in a process engineering plant but without shutting off the fluid flow to the process engineering plant during the testing, comprising the steps of:

provyding a bypass valve connected in parallel to the safety valve;

with said fluid flow flowing for said normal operation opening the safety valve from a fully closed position to at least a partially open position permitting a predetermined flow through the bypass valve bypassing the safety valve and which is less than a full flow through the safety valve in said normal operation;

simulating an emergency situation by now at least partially closing the safety valve;

at least one of sensing an existing pressure difference across said safety valve for a leakage testing, detecting a travel time of said safety valve, or detecting a distance of travel of said safety valve; and comparing at least one of said pressure difference, travel time, or distance of travel to a respective reference value as specified when the safety valve is functioning correctly to determine whether or not the safety valve is functioning correctly.

9. A method for function testing of a safety valve for a process engineering plant, comprising the steps of:

testing whether the safety valve travels from a normal position to a predetermined final position as a fully opened or closed end position in a certain operating situation of the plant, and wherein a bypass valve bypasses said safety valve and is capable of assuming an idle position as a closed position in a normal operation of the plant and a predetermined test position for function testing of said safety valve; and establishing the test position of the bypass valve such that a predetermined fluid flow through the bypass valve is permitted and the fluid flow through the bypass valve is set such that with said safety valve in its final position at least one of an existing predetermined pressure difference is sensed for a leakage testing, a travel time is detected, or a distance of travel is detected for the safety valve.

* * * * *

UNITED STATES PATENT AND TRADEMARK OFFICE
CERTIFICATE OF CORRECTION

PATENT NO. : 7,621,170 B2  Page 1 of 1
APPLICATION NO. : 11/870091
DATED : November 24, 2009
INVENTOR(S) : Hoffmann et al.

It is certified that error appears in the above-identified patent and that said Letters Patent is hereby corrected as shown below:

On the front page of the Patent - Item (73) Assignee: Siemens Atkiengesellschaft, Munich The Assignee is incorrect. The Assignee should read: Item --(73) Samson Aktiengesellschaft.--

Signed and Sealed this

Second Day of February, 2010

David J. Kappos
*Director of the United States Patent and Trademark Office*